(12) United States Patent
Kim et al.

(10) Patent No.: US 11,329,778 B2
(45) Date of Patent: May 10, 2022

(54) RESOURCE ALLOCATION METHOD AND APPARATUS, AND SIGNAL TRANSMISSION METHOD

(71) Applicant: ELECTRONICS AND TELECOMMUNICATIONS RESEARCH INSTITUTE, Daejeon (KR)

(72) Inventors: Ji Hung Kim, Daejeon (KR); Jun Hwan Lee, Seoul (KR); Jung Hoon Lee, Daejeon (KR); Sung Hyun Moon, Daejeon (KR); Ju Ho Park, Daejeon (KR); Cheul Soon Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 515 days.

(21) Appl. No.: 16/324,174

(22) PCT Filed: Oct. 31, 2017

(86) PCT No.: PCT/KR2017/012180
§ 371 (c)(1),
(2) Date: Feb. 8, 2019

(87) PCT Pub. No.: WO2018/080283
PCT Pub. Date: May 3, 2018

(65) Prior Publication Data
US 2021/0359804 A1    Nov. 18, 2021

(30) Foreign Application Priority Data
Oct. 31, 2016    (KR) ........................ 10-2016-0143763

(51) Int. Cl.
*H04L 5/00* (2006.01)

(52) U.S. Cl.
CPC .................................. *H04L 5/0048* (2013.01)

(58) Field of Classification Search
CPC ..................................................... H04L 5/0048
See application file for complete search history.

(56) References Cited

U.S. PATENT DOCUMENTS 7,660,229 B2    2/2010  Papasakellariou et al.
8,351,320 B2    1/2013  Cho et al.
(Continued)

OTHER PUBLICATIONS

Samsung, "Multiplexing URLLC and eMBB in DL", R1-1609059, 3GPP TSG RAN WG1 Meeting #86bis, Lisbon, Portugal, Oct. 10-14, 2016.
(Continued)

*Primary Examiner* — Duc C Ho
(74) *Attorney, Agent, or Firm* — LRK Patent Law Firm

(57) ABSTRACT

The present invention relates to a resource allocation method and apparatus, and a signal transmission method, which are applicable to various technical scenarios of 5G New Radio (NR). A method for operating a communication node for resource allocation in a communication network includes: allocating first data and a first pilot for a first type service to a first block period of a first subframe; allocating second data and a second pilot for a second type service to a second block period overlapping with the first block period; and transmitting the first subframe to another communication node. Here, at least one of the second data and the second pilot is allocated to an area to which the first data is allocated.

20 Claims, 14 Drawing Sheets

(56) References Cited

U.S. PATENT DOCUMENTS

| | | | |
|---|---|---|---|
| 8,718,155 B2 | 5/2014 | Kim et al. | |
| 9,397,810 B2 | 7/2016 | Kim et al. | |
| 2016/0095074 A1* | 3/2016 | Park | H04W 56/001 370/350 |
| 2016/0269212 A1 | 9/2016 | Vilaipornsawai et al. | |
| 2018/0035459 A1* | 2/2018 | Islam | H04W 74/04 |
| 2018/0103428 A1* | 4/2018 | Jiang | H04W 52/0225 |
| 2018/0115966 A1* | 4/2018 | Chen | H04L 5/0007 |
| 2018/0124711 A1* | 5/2018 | Hosseini | H04W 52/146 |
| 2019/0191453 A1* | 6/2019 | Xiong | H04L 5/0037 |

OTHER PUBLICATIONS

Sony, "Multiplexing eMBB and URLLC Transmissions", R1-1608942, 3GPP TSG RAN WG1 Meeting #86bis, Lisbon, Portugal Oct. 10-14, 2016.

ZTE et al., "Multiplexing of eMBB and URLLC", R1-166408, 3GPP TSG RAN WG1 Meeting #86, Gothenburg, Sweden, Aug. 22-26, 2016.

Frank Schaich et al., "Preliminary results for multi-service support in link solution adaptation", Fantastic-5G, Deliverable D3.1, Ver. 1.0.0, Jun. 2016.

Search report, dated Feb. 19, 2018, for International Application No. PCT/KR2017/012180.

Written opinion, dated Feb. 19, 2018, for International Application No. PCT/KR2017/012180.

\* cited by examiner

RESOURCE ALLOCATION METHOD AND APPARATUS, AND SIGNAL TRANSMISSION METHOD

CROSS-REFERENCE TO RELATED APPLICATIONS

The present application is a U.S. National Phase entry from International Application No. PCT/KR2017/012180, filed Oct. 31, 2017, which claims priority to Korean Patent Application No. 10-2016-0143763, filed Oct. 31, 2016, the disclosures of which are incorporated by reference herein in their entirety.

BACKGROUND

1. Technical Field

The present invention relates to a method and an apparatus for resource allocation, and more particularly, to a method and an apparatus for resource allocation which are applicable to various technical scenarios of 5G new radio (NR), and a method for signal transmission.

2. Description of Related Art

In the 5G mobile communication system, application of a broadband radio transmission using a millimeter wave (mm-Wave) band of 6 GHz or more and a beamforming technique using a massive antenna are being considered. The 5G mobile communication system is being developed, and three technical scenarios are under development. The three technical scenarios may be defined as an enhanced mobile broadband (eMBB), an ultra-reliable low-latency communication (URLLC), and a massive machine-type communication (mMTC). Each of such the three technical scenarios has a different service and requirements. Therefore, a signal transmission method and a signal transmission apparatus applicable to the various technical scenarios of 5G new radio (NR) are required.

SUMMARY

In order to solve the above-described problem, the present invention is directed to providing a method and an apparatus for resource allocation which are applicable to various technical scenarios of 5G new radio (NR), and a method for signal transmission.

In order to solve the above-described problem, the present invention is directed to providing a method and an apparatus for resource allocation which are applicable to 5G new radio (NR).

In order to solve the above-described problem, the present invention is directed to providing an enhanced cross-link interference mitigation method which is applicable to 5G new radio (NR).

An operation method of a communication node for achieving the above-described objective may comprise allocating first data and first pilots for a first type service to a first block period of a first subframe; allocating second data and second pilots for a second type service to a second block period overlapping with the first block period; and transmitting the first subframe to another communication node, wherein at least one of the second data and the second pilots are allocated to a region to which the first data is allocated.

The first pilots and the second pilots may be allocated to different locations on a time axis.

The first pilots and the second pilots may be allocated to same locations on a frequency axis.

The operation method may further comprise receiving a retransmission request of the first data transmitted through the first subframe; reallocating the first data retransmission of which is requested and the first pilots to a second subframe; and transmitting the second subframe.

In the reallocating to the second subframe, the first data retransmission of which is requested and the first pilots may be allocated to locations different from locations of third data for the second type service.

In the reallocating to the second subframe, the first data retransmission of which is requested and the first pilots may be allocated to locations different from locations of third pilots for the second type service.

The first data retransmitted through the second subframe may be allocated to a same frequency band as a frequency band allocated to the first subframe.

Each of the first type service and the second type service may be one of an enhanced mobile broadband (eMBB) service, an ultra-reliability low-latency communication (URLLC) service, and a massive machine-type communication (mMTC) service, and the first type service is different from the second type service.

An operation method of a communication node for achieving the above-described objective may comprise allocating first data and first pilots for a first type service to a first block period of a first subframe; allocating second data and second pilots for a second type service to a second block period overlapping with the first block period; and transmitting the first subframe to another communication node, wherein at least one of the second data and the second pilots are allocated to a region to which the first pilots are allocated.

The first pilots and the second pilots may be allocated to same locations on a time axis.

The first pilots and the second pilots may be allocated to different locations on a frequency axis.

The operation method may further comprise receiving a retransmission request of the first data transmitted through the first subframe; reallocating the first data retransmission of which is requested and the first pilots to a second subframe; and transmitting the second subframe.

In the reallocating to the second subframe, the first data retransmission of which is requested and the first pilots may be allocated to locations different from locations of third data for the second type service.

In the reallocating to the second subframe, the first data retransmission of which is requested and the first pilots may be allocated to locations different from locations of third pilots for the second type service.

The first data retransmitted through the second subframe may be allocated to a same frequency band as a frequency band allocated to the first subframe.

Each of the first type service and the second type service may be one of an enhanced mobile broadband (eMBB) service, an ultra-reliability low-latency communication (URLLC) service, and a massive machine-type communication (mMTC) service, and the first type service is different from the second type service.

An operation method of a communication node for achieving the above-described objective may comprise receiving from a transmitting-end communication node a first subframe to which first data and first pilots of a first type service and second data and second pilots for a second type service different from the first type service; and decoding the first data using the first pilots, wherein the first data is allocated to the first subframe so as to overlap with at least one of the second data and the second pilots.

The first pilots may be allocated to locations different from locations of the second data and the second pilots on a frequency axis and a time axis.

The operation method may further comprise requesting the transmitting-end communication node to retransmit the first data; and receiving a second subframe to which the first data retransmission of which is requested and the first pilots, and third data and third pilots for the second type service are allocated, wherein the first data retransmission of which is requested and the first pilots are allocated to locations different from locations of the third data and the third pilots.

The first data retransmitted through the second subframe may be allocated to a same frequency band as a frequency band allocated to the first subframe.

Advantageous Effects

The present invention can provide an overlapped resource allocation method, a signal transmission method, and a signal transmission apparatus which are applicable to various technical scenarios of 5G new radio (NR). Also, the signal transmission method and apparatus according to the embodiments of the present invention can reduce cross-link interferences by applying multiple numerologies when allocating pilot signals to a subframe, and by disposing a guard band between data signals and pilot signals.

DETAILED DESCRIPTION OF THE INVENTION

Figure 1:
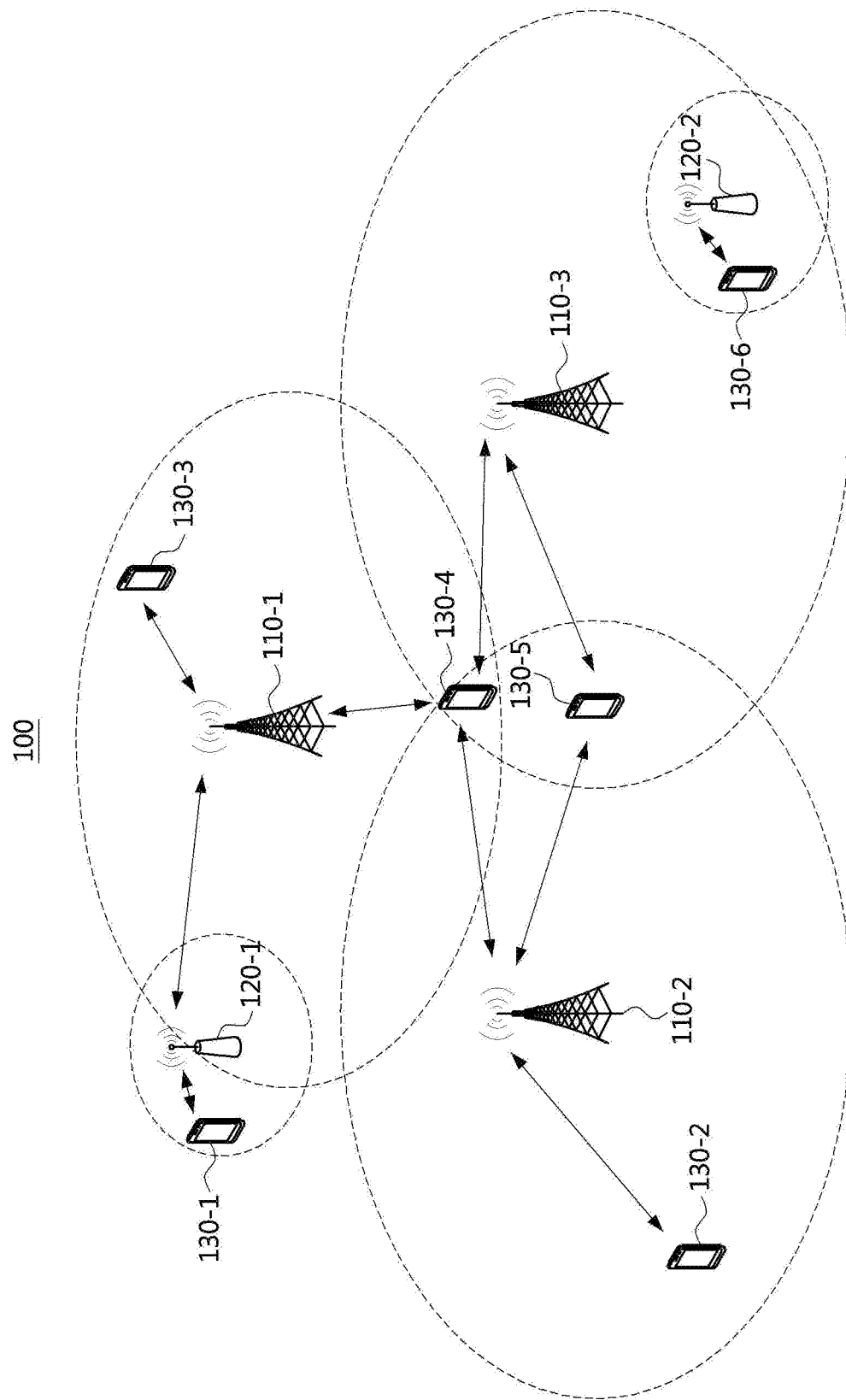
FIG. 1 is a conceptual diagram illustrating a first embodiment of a communication system.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

FIG. 1 is a conceptual diagram illustrating a first embodiment of a cellular communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Here, the communication 100 may also be referred to as a 'communication network'. Each of the plurality of communication nodes may support at least one communication protocol among a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, and a space division multiple access (SDMA) based communication protocol. Also, each of the plurality of communication nodes may have the following structure.

Figure 2:
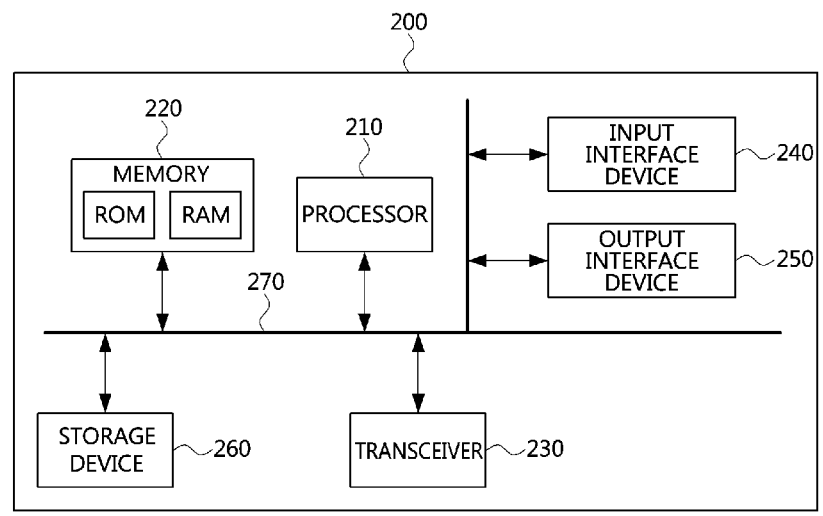
FIG. 2 is a block diagram illustrating a first embodiment of a communication node constituting a communication system.

FIG. 2 is a block diagram illustrating a first embodiment of a communication node constituting a cellular communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), a relay node, or the like. Each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, or the like.

Each of the plurality of communication nodes 110-1, 110-2, 110-3, 120-1, 120-2, 130-1, 130-2, 130-3, 130-4, 130-5, and 130-6 may support the cellular communication (e.g., long term evolution (LTE), LTE-Advanced (LTE-A), or the like specified in the 3rd generation partnership project (3GPP) standard). Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, a device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Figure 3:
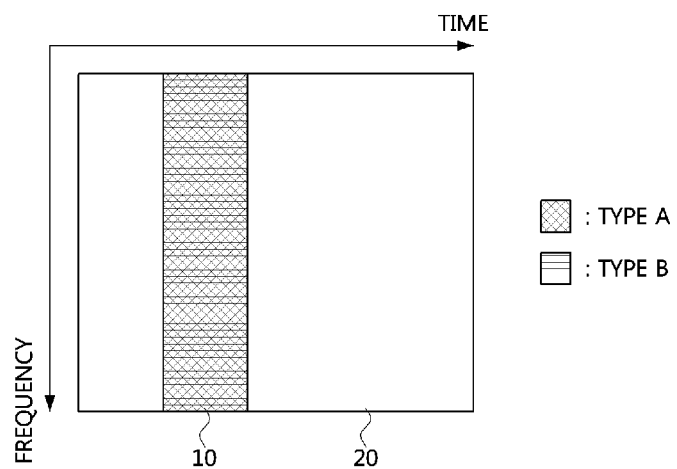
FIG. 3 is a diagram illustrating resource allocation by a time division multiplexing (TDM) scheme.
Figure 4:
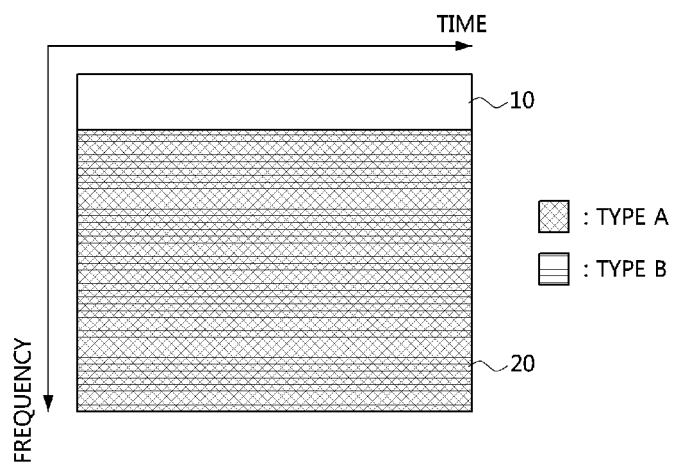
FIG. 4 is a diagram illustrating resource allocation by a frequency division multiplexing (FDM) scheme.

FIG. 3 is a diagram illustrating resource allocation by a time division multiplexing (TDM) scheme. FIG. 4 is a diagram illustrating resource allocation by a frequency division multiplexing (FDM) scheme.

Referring to FIGS. 3 and 4, in the 5G communication system, a communication node 200 may allocate radio resources in order to provide enhanced mobile broadband (eMBB) services, ultra-reliability low-latency communication (URLLC) services, and massive machine-type communication (mMTC) services. Here, as shown in FIG. 3, the communication node 200 may allocate resources to a frame in a time division multiplexing (TDM) scheme for a first type (i.e., type A) service and a second type (i.e., type B) service which are different from each other. In this case, resources 10 for the first type (i.e., type A) service may be arranged in a part of a time domain of the frame and resources 20 for the second type (i.e., type B) service may be arranged in the remaining part of the time domain of the frame. Also, as shown in FIG. 4, the communication node 200 may allocate resources in a frequency division multiplexing (FDM) scheme for the first type (i.e., type A) service and the second type (i.e., type B) service which are different from each other. In this case, the resources 10 for the first type (i.e., type A) service may be arranged in a part of a frequency domain of the frame and the resources 20 for the second type (i.e., type B) service may be arranged in the remaining part of the frequency domain of the frame.

Figure 5:
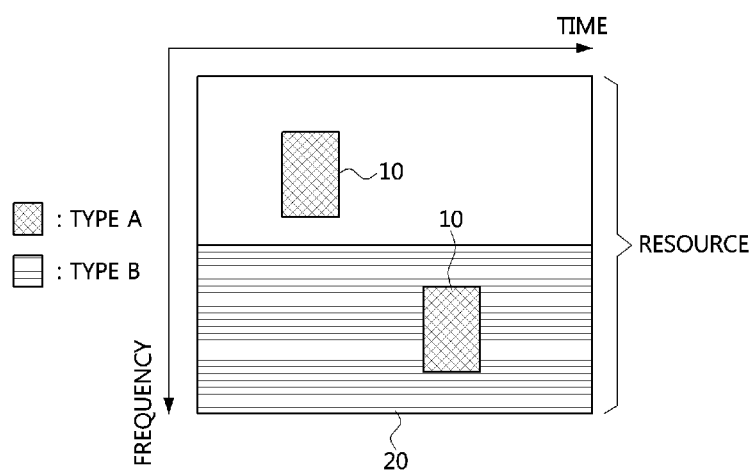
FIG. 5 is a diagram illustrating a resource allocation method for an ultra-reliability low-latency communication (URLLC) as a resource allocation method for satisfying specific requirements.

FIG. 5 is a diagram illustrating a resource allocation method for an ultra-reliability low-latency communication (URLLC) as a resource allocation method for satisfying specific requirements.

Referring to FIG. 5, in the 5G communication system, the communication node 200 may allocate radio resources in order to provide enhanced mobile broadband (eMBB) services, ultra-reliability low-latency communication (URLLC) services, and massive machine-type communication (mMTC) services. Here, when the second type (i.e., type B) service requires the URLLC, the communication node 200 may adjust resource allocations for the first type (i.e., type A) service and the second type (i.e., type B) service in order to satisfy the requirements of the second type (i.e., type B) service.

For example, in order to satisfy the requirements of the URLLC, the communication node 200 may allocate the resources 20 for the second type (i.e., type B) service in a region in a subframe, to which the resources 10 for the first type (i.e., type A) service have been already allocated. For this, the communication node 200 may vacate a part of the region already allocated as the resources 10 for the first type (i.e., type A) service, and allocate the resources 20 for the second type (i.e., type B) service in the vacated part. Also, the communication node 200 may allocate the resources 20 for the second type (i.e., type B) service so as to overlap with the resources 10 for the first type (i.e., type A) service. Hereinafter, such the resource allocation method may be referred to as an 'overlapped resource allocation method'.

The transmitting-end communication node 200 may allocate the resources 10 for the first type (i.e., type A) service and the resources 20 for the second type (i.e., type B) service in the frame according to the overlapped resource allocation method, and transmit information on the allocated resources to a receiving-end communication node. In this case, a first receiving-end communication node of the first type (i.e., type A) service may be able to detect the resources 10 for the first type (i.e., type A) service in the received frame. Also, a second receiving-end communication node of the second type (i.e., type B) service may be able to detect the resources 20 for the second type (i.e., type B) service in the received frame. Here, the transmitting-end communication node 200 may be a base station, and each of the receiving-end communication nodes may be a terminal. However, without being limited to this, the transmitting-end communication node 200 may be a terminal, and the receiving-end communication node may be a base station.

According to the amount of allocated resources and a transmission scheme of the second type (i.e., type B) service arranged in the region to which the resources 10 for the first type (i.e., type A) are allocated, the detection of the resources 10 for the first type (i.e., type A) service at the first receiving-end communication node and the detection of the resources 20 for the second type (i.e., type B) service at the second receiving-end communication node may be affected. Also, the detection of the resource 10 for the first type (i.e., type A) service at the first receiving-end communication node (i.e., a first terminal) by estimating a channel based on a pilot (e.g., reference signal) and the detection of the resource 20 for the second type (i.e., type B) service at the second receiving-end communication node (i.e., a second terminal) may be affected.

In the present invention, an overlapped resource allocation method is proposed considering first pilots for reception of the resources 10 for the first type (i.e., type A) service and second pilots for reception of the resources 20 for the second type (i.e., type B) service. Further, the present invention considers a technical scenario for duplexing and proposes a frame transmission method that is more flexible than the dynamic time division duplex (TDD) developed in the release 12 of the 3GPP LTE. In this case, influence of cross-link interference between uplink (UL) and downlink (DL) may be large, so that a pilot design scheme for interference mitigation is proposed.

Figure 6:
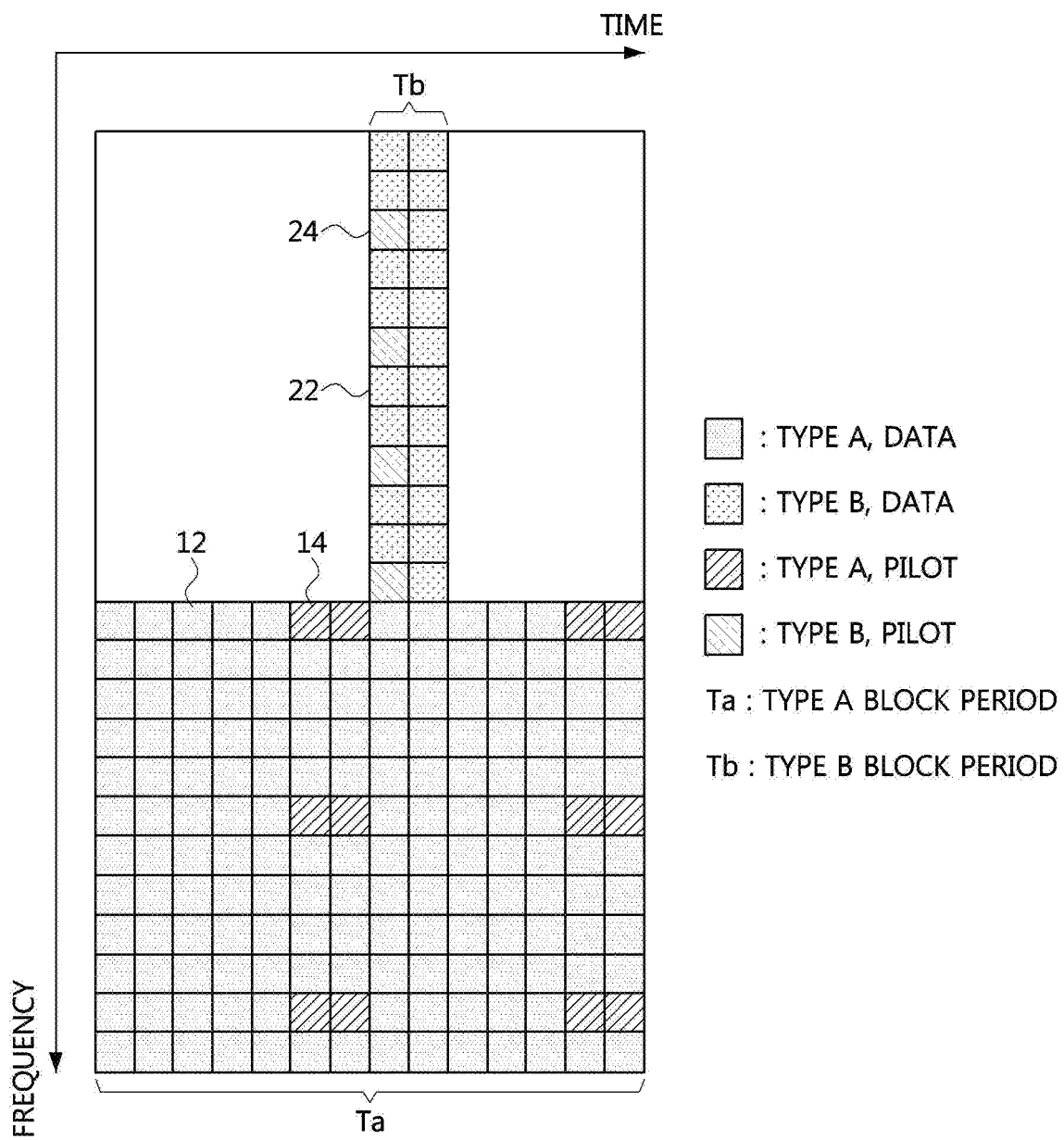
FIG. 6 is a diagram illustrating a resource allocation method for different service types by a frequency division multiplexing (FDM) scheme.

The communication node 200 may allocate resources according to a service type by frequency division multiplexing (FDM). In this case, the communication node 200 may allocate data 12 and pilots 14 of the first type (i.e., type A) service in a first frequency band by the frequency division multiplexing (FDM) scheme. Also, the communication node 200 may allocate data 22 and pilots 24 of the second type (i.e., type B) service in the first frequency band by the frequency division multiplexing (FDM) scheme. The pilots 14 and 24 may be used for measurement of various parameters or demodulation of the corresponding data according to a transmission scheme. In FIG. 6, a first block period Ta may indicate one block period in which the data 12 and the pilots 14 of the first type (i.e., type A) service are consecutively allocated on the time axis. Also, a second block period Tb may indicate one block period in which the data 22 and the pilots 24 of the second type (i.e., type B) service are consecutively allocated on the time axis.

Figure 7:
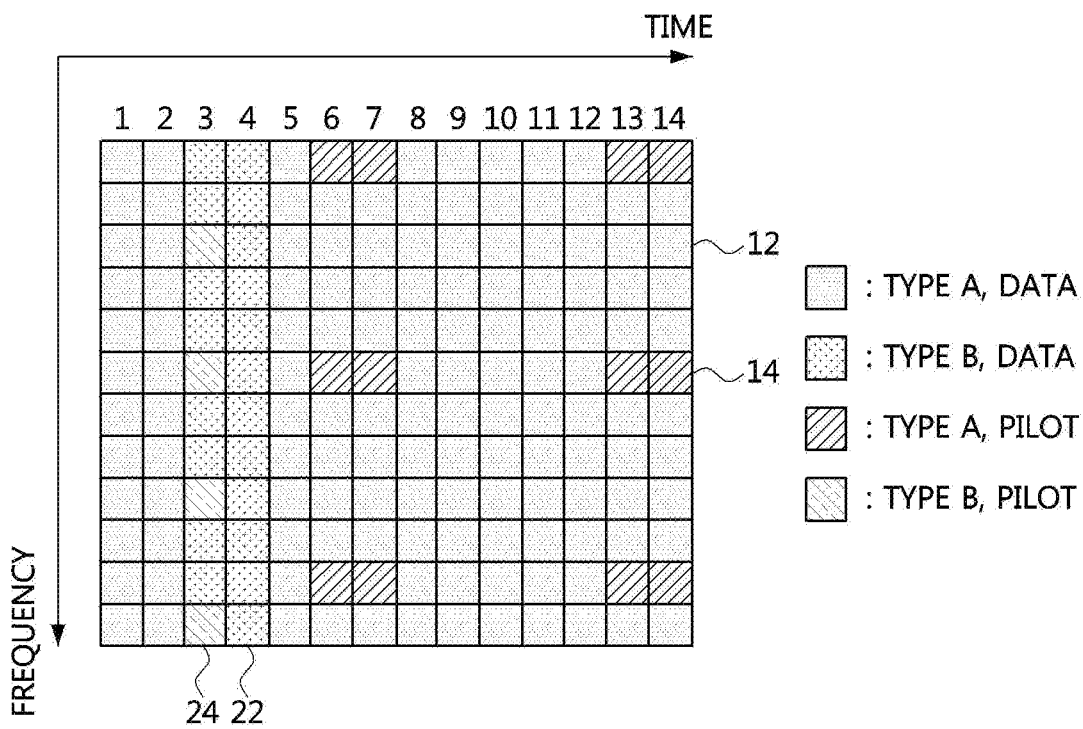
FIG. 7 is a diagram illustrating an overlapped resource allocation method according to a first embodiment.

FIG. 7 is a diagram illustrating an overlapped resource allocation method according to a first embodiment.

Referring to FIG. 7, the communication node 200 may allocate the data 12 of the first type (i.e., type A) service in a first subframe, and allocate the data 22 and the pilots 24 of the second type (i.e., type B) service different from the first type (i.e., type A) service in the region to which the data 12 of the first type (i.e., type A) service is allocated. That is, the communication node 200 may overlap and allocate the data 22 and the pilots 24 of the second type (i.e., type B) service to the region to which the data 12 of the first type (i.e., type A) service is allocated. For example, each of the first type (i.e., type A) service and the second type (i.e., type B) service may be one of the enhanced mobile broadband (eMBB) service, the ultra-reliability low-latency communication (URLLC) service, and the massive machine-type communication (mMTC) service, and the first type (i.e., type A) service may be different from the second type (i.e., type B) service.

Here, the communication node 200 may allocate the pilots 14 of the first type (i.e., type A) service and the pilots 24 of the second type (i.e., type B) service to different locations on the time axis. Also, the communication node 200 may then allocate a portion of the pilots 14 of the first type (i.e., type A) service and a portion of the pilots 24 of the second type (i.e., type B) service to the same locations on the frequency axis. Specifically, in FIG. 7, among 4 pilots 24 of the second type (i.e., type B) service, 3 pilots may be allocated on the frequency axis at different locations from those of the pilots 14 of the first type (i.e., type A) service. In FIG. 7, among 4 pilots 24 of the second type (i.e., type B) service, one pilot may be allocated on the frequency axis at the same location as that of the pilots 14 of the first type (i.e., type A) service.

The communication node 200 may transmit the first subframe to which the resources for the first type (i.e., type A) service and the resources for the second type (i.e., type B) service are allocated to the first receiving-end communication node requesting the first type service (i.e., type A) service and the second receiving-end communication node requesting the second type service (i.e., type B). The first receiving-end communication node receiving the first subframe may estimate a channel by using the first pilots allocated to the first subframe and decode first data. Also, the second receiving-end communication node receiving the first subframe may estimate a channel by using the second pilots allocated to the first subframe and decode second data.

Figure 8:
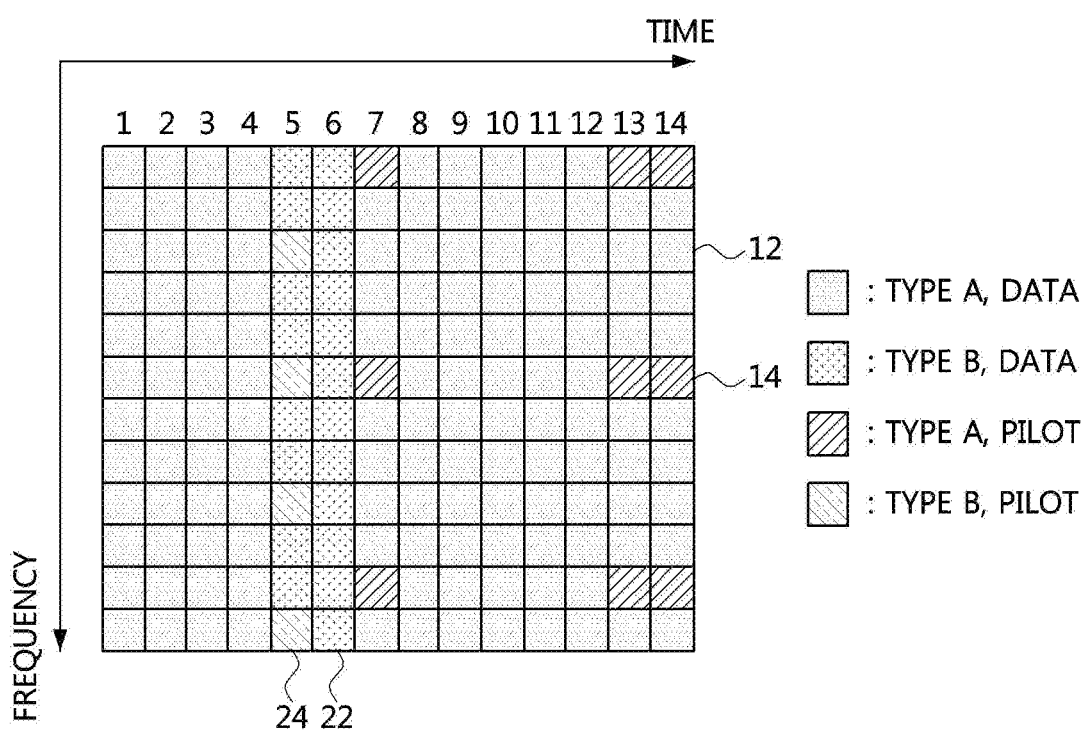
FIG. 8 is a diagram illustrating an overlapped resource allocation method according to a second embodiment.

FIG. 8 is a diagram illustrating an overlapped resource allocation method according to a second embodiment.

Referring to FIG. 8, the communication node 200 may allocate a portion of the data 22 and the entire pilots 24 of the second type (i.e., type B) service different from the first type (i.e., type B) service to the region to which the data 12 of the first type (i.e., type A) service is allocated, and allocate the remaining portion of the data 22 of the second type (i.e., type B) service to the region to which the pilots 14 of the first type (i.e., type A) service are allocated. That is, the communication node 200 may allocate, in the overlapping manner, a portion of the data 22 and the entire pilots 24 of the second type (i.e., type B) service to the region to which the data 12 of the first type (i.e., type A) service is allocated. Also, the communication node 200 may allocate the remaining portion of the data 22 of the second type (i.e., type B) service in the region to which the pilots 14 of the first type (i.e., type A) service are allocated.

The data 12 of the first type (i.e., type A) service is allocated between the pilots 14 of the first type (i.e., type A) service on the frequency axis. Thus, a portion of the data 22 of the second type (i.e., type B) service may be overlapped with the pilots 14 of the first type (i.e., type A) service in the region to which the pilots 14 of the first type (i.e., type A) service are allocated, and a portion of the data 22 of the second type (i.e., type B) service may be overlapped with the data 12 of the first type (i.e., type A) service.

Here, the communication node 200 may allocate the pilots 14 of the first type (i.e., type A) service and the pilots 24 of the second type (i.e., type B) service to different locations on the time axis. Also, the communication node 200 may allocate a portion of the pilots 14 of the first type (i.e., type A) service and a portion of the pilots 24 of the second type (i.e., type B) service to the same locations on the frequency axis. Specifically, in FIG. 8, among 4 pilots 24 of the second type (i.e., type B) service, 3 pilots may be allocated on the frequency axis at different locations from those of the pilots 14 of the first type (i.e., type A) service. In FIG. 7, among 4 pilots 24 of the second type (i.e., type B) service, 1 pilot may be allocated on the frequency axis at the same location as that of the pilots 14 of the first type (i.e., type A) service.

Figure 9:
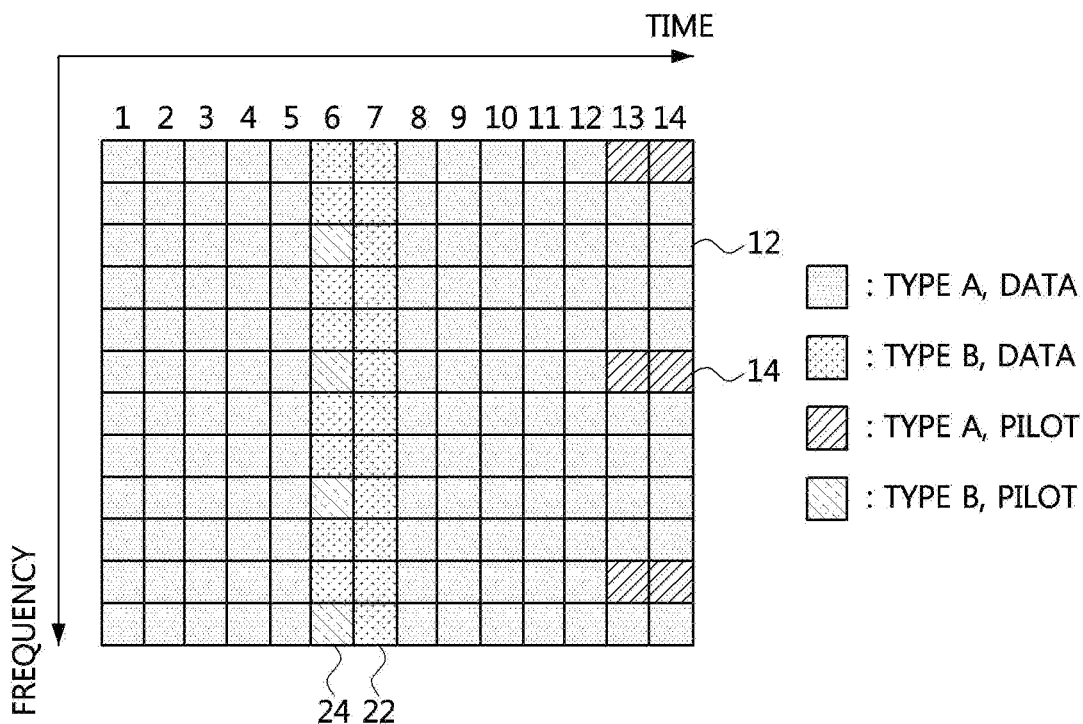
FIG. 9 is a diagram illustrating an overlapped resource allocation method according to a third embodiment.

FIG. 9 is a diagram illustrating an overlapped resource allocation method according to a third embodiment.

Referring to FIG. 9, the communication node 200 may allocate the data 22 and the pilots 24 of the second type (i.e., type B) service different from the first type (i.e., type B) service to the region to which the pilots 14 of the first type (i.e., type A) service are allocated. The data 12 of the first type (i.e., type A) service is allocated between the pilots 14 of the first type (i.e., type A) service on the frequency axis. Thus, a portion of the data 22 of the second type (i.e., type B) service may be overlapped with the pilots 14 of the first type (i.e., type A) service in the region to which the pilots 14 of the first type (i.e., type A) service are allocated, and a portion of the data 22 of the second type (i.e., type B) service may be overlapped with the data 12 of the first type (i.e., type A) service.

Here, the communication node 200 may allocate the pilots 14 of the first type (i.e., type A) service and the pilots 24 of the second type (i.e., type B) service to the same locations on the time axis. Also, the communication node 200 may allocate a portion of the pilots 14 of the first type (i.e., type A) service and a portion of the pilots 24 of the second type (i.e., type B) service to the same locations on the frequency axis. Specifically, in FIG. 9, among 4 pilots 24 of the second type (i.e., type B) service, 1 pilot may be allocated on the frequency axis at the same location as that of the pilots 14 of the first type (i.e., type A) service. In FIG. 9, among 4 pilots 24 of the second type (i.e., type B) service, 1 pilot may be allocated on the frequency axis at the same location as that of the pilots 14 of the first type (i.e., type A) service. That is, one pilot among the 4 pilots 24 of the second type (i.e., type B) service may overlap with one of the pilots 14 of the first type (Type A) service.

Figure 10:
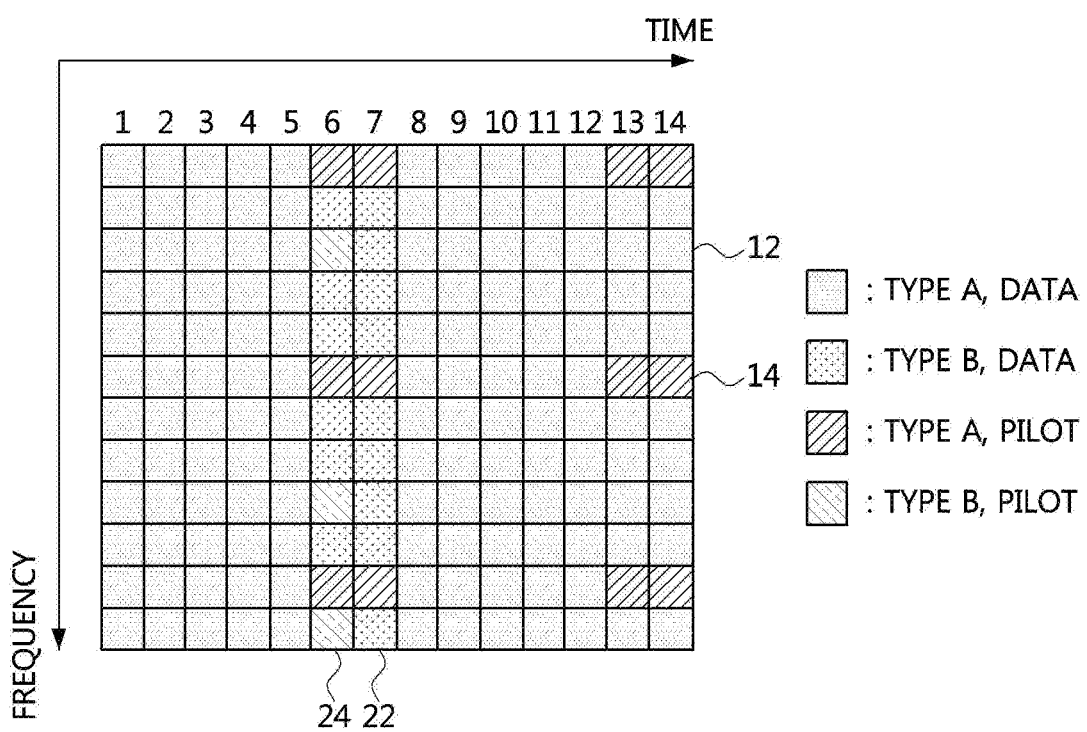
FIG. 10 is a diagram illustrating an overlapped resource allocation method according to a fourth embodiment.

FIG. 10 is a diagram illustrating an overlapped resource allocation method according to a fourth embodiment.

Referring to FIG. 10, the communication node 200 may allocate the data 22 and the pilots 24 of the second type (i.e., type B) service different from the first type (i.e., type B) service to the region to which the pilots 14 of the first type (i.e., type A) service are allocated. In this case, the communication node 200 may allocate the data 22 and the pilots 24 of the second type (i.e., type B) service so as not to overlap with the pilots 14 of the first type (i.e., type A) service. The communication node 200 may allocate the data 22 and the pilots 24 of the second type (i.e., type B) service to overlap with the data 12 of the first type (i.e., type A) service.

Here, the communication node 200 may allocate the pilots 14 of the first type (i.e., type A) service and the pilots 24 of the second type (i.e., type B) service to the same locations on the time axis. That is, the pilots 14 of the first type (i.e., type A) service and the pilots 24 of the second type (i.e., type B) service may not overlap. Also, the communication node 200 may allocate the pilots 14 of the first type (i.e., type A) service and the data 22 of the second type (i.e., type B) service so that they do not overlap.

An index of the data 12 of the first type (i.e., type A) service may be expressed by Equation 1 below.

$$\Lambda^A=\{\lambda_i^A|i=0,\ldots,D^A-1\}$$ [Equation 1]

In Equation 1, $D^A$ is the number of subcarriers of the data 12 of the first type (i.e., type A) service of the first block period Ta, and $\lambda_i^A$ may be mapped to the subcarrier locations of the data 12 in one-to-one manner.

An index of the pilots 14 of the first type (i.e., type A) service may be expressed by Equation 2 below.

$$\Gamma^A=\{\gamma_i^A|i=0,\ldots,N^A-1\}$$ [Equation 2]

In Equation 2, $N^A$ is the number of subcarriers of the pilots 14 of the first type (i.e., type A) service of the first block period Ta, and $\gamma_i^A$ may be mapped to the subcarrier locations of the pilots 14 in one-to-one manner.

An index of the data 22 of the second type (i.e., type B) service may be expressed by Equation 3 below.

$$\Lambda^B=\{\lambda_i^B|i=0,\ldots,D^B-1\}$$ [Equation 3]

In Equation 3, $D^B$ is the number of subcarriers of the data 22 of the second type (i.e., type B) service of the second block period Tb, and $\gamma_i^B$ may be mapped to the subcarrier locations of the data 22 in one-to-one manner.

An index of the pilots 24 of the second type (i.e., type B) service may be expressed by Equation 4 below.

$$\Gamma^B=\{\gamma_i^B|i=0,\ldots,N^B-1\}$$ [Equation 4]

In Equation 4, $N^B$ is the number of subcarriers of the pilots 24 of the second type (i.e., type B) service of the second block period Tb, and $\gamma_i^B$ may be mapped to the subcarrier locations of the pilots 24 in one-to-one manner.

The communication node 200 may transmit the first subframe to which the resources for the first type (i.e., type A) service and the resources for the second type (i.e., type B) service are allocated to the first receiving-end communication node requesting the first type service (i.e., type A) service and the second receiving-end communication node requesting the second type service (i.e., type B). The first receiving-end communication node receiving the first subframe may estimate a channel by using the first pilots allocated to the first subframe and decode first data. Also, the second receiving-end communication node receiving the first subframe may estimate a channel by using the second pilots allocated to the first subframe and decode second data.

Figure 11:
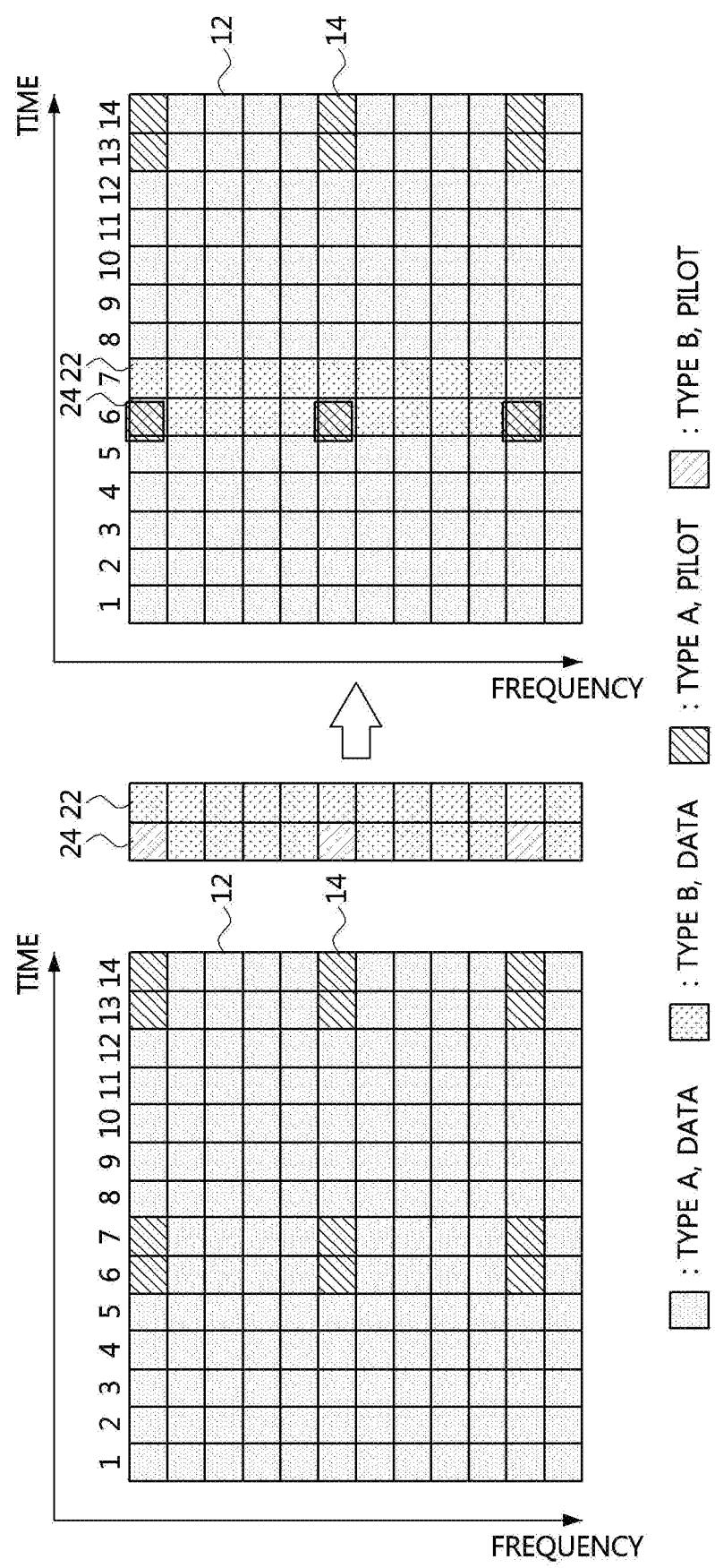
FIG. 11 is a diagram illustrating an overlapped resource allocation method according to a fifth embodiment.

FIG. 11 is a diagram illustrating an overlapped resource allocation method according to a fifth embodiment.

Referring to FIG. 11, the communication node 200 may allocate, in the overlapping manner, the data 22 and the pilots 24 of the second type (i.e., type B) service different from the first type (i.e., type A) service to the region to which the data 12 and the pilots 14 of the first type (i.e., type A) service are allocated. In this case, the communication node 200 may overlap the data 12 of the first type (i.e., type A) service with a portion of the data of the second type (i.e., type B) service. Also, the communication node 200 may overlap the pilots 14 of the first type (i.e., type A) service with the remaining portion of the data 22 and the pilots 24 of the second type (i.e., type B) service.

Here, the communication node 200 may allocate the pilots 14 of the first type (i.e., type A) service and the pilots 24 of the second type (i.e., type B) service to the same locations on the time axis and the same locations on the frequency axis. That is, the pilots 14 of the first type (i.e., type A) service and the pilots 24 of the second type (i.e., type B) service are overlapped. Also, the communication node 200 may overlap the pilots 14 of the first type (i.e., type A) service with the data 22 of the second type (i.e., type B) service.

The communication node 200 may transmit the first subframe to which the resources for the first type (i.e., type A) service and the resources for the second type (i.e., type B) service are allocated to the first receiving-end communication node requesting the first type service (i.e., type A) service and the second receiving-end communication node requesting the second type service (i.e., type B). The first receiving-end communication node receiving the first subframe may estimate a channel by using the first pilots allocated to the first subframe and decode first data. Also, the second receiving-end communication node receiving the first subframe may estimate a channel by using the second pilots allocated to the first subframe and decode second data.

Figure 12:
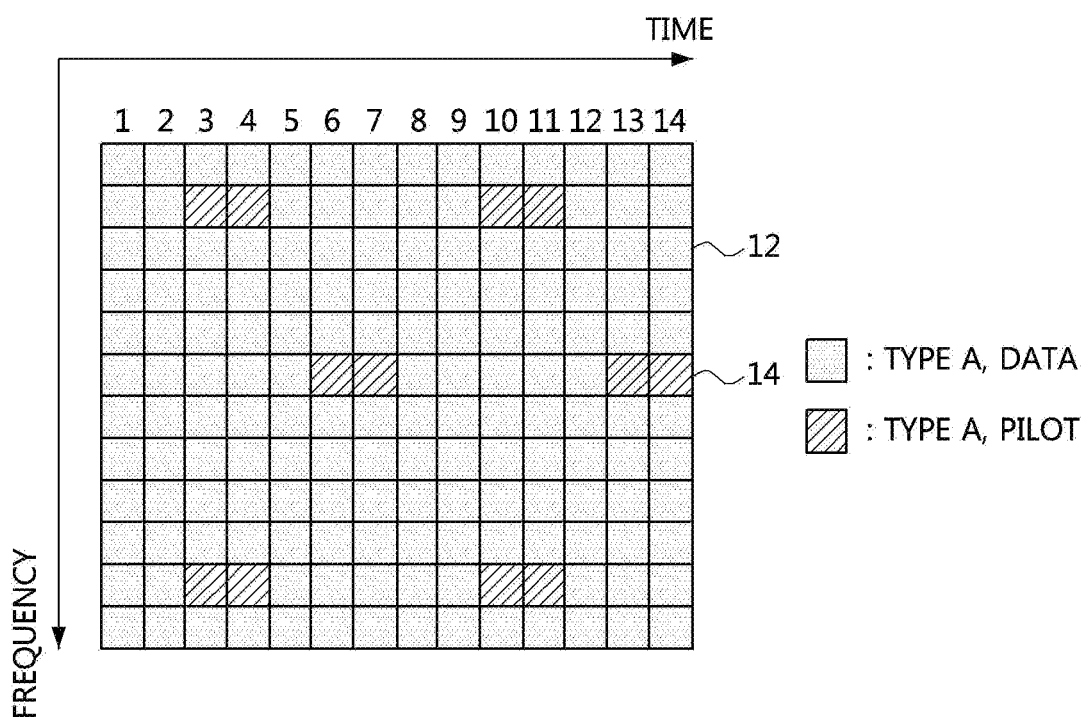
FIG. 12 is a diagram illustrating a pilot arrangement scheme of a first service type in an overlapped resource allocation method.

FIG. 12 is a diagram illustrating a pilot arrangement scheme of a first service type in an overlapped resource allocation method.

Referring to FIG. 12, the communication node 200 may allocate the pilots 14 of the first type (i.e., type A) service in a zigzag form on the time axis in the subframe. As shown in FIG. 12, the communication node 200 may allocate subcarriers of the pilots 14 in various locations in the subframe, and allocate subcarriers of the data 12 to the locations remaining after allocating the pilots 14.

A First Scheme for Allocating Pilots of the First Type (i.e., Type A) Service

Referring again to FIG. 8, the communication node 200 may allocate the resources 22 and 24 for the second type (i.e., type B) service so that $\Gamma^A \cap \Lambda^B=0$ and $\Gamma^A \cap \Gamma^B=0$ by applying the overlapped resource allocation method. Here, $\Gamma^A$ denotes the region to which the pilots 14 of the first type (i.e., type A) service are allocated, and $\Lambda^B$ denotes the region to which the data 22 of the second type (i.e., type B) service is allocated. Also, $\Gamma^B$ denotes the region to which the pilots 24 of the second type (i.e., type B) service are allocated.

For example, when the resources for the first type (i.e., type A) service are scheduled to be transmitted in $1^{st}$ to $14^{th}$ symbols, a transmission request for the resources for the second type (i.e., type B) service may be made at the $n^{th}$ symbol (i.e., n=1, ..., 14). In this case, the communication 200 may allocate and transmit the resources for the second type (i.e., type B) service in the (n+k)-th symbol (k≥0). The transmission time of the second type (i.e., type B) service may be from the (n+k)-th symbol to the (n+k+Tb)-th symbol (Here, Tb is the second block period). In this case, the $6^{th}$, $7^{th}$, $13^{th}$, and $14^{th}$ symbols among the (n+k)-th symbol to the (n+k+Tb)-th symbol may correspond to the region to which the pilots 14 of the first type (i.e., type A) service are allocated, and may not be included in the transmission time of the second type (i.e., type B) service.

A Second Scheme for Allocating Pilots of the First Type (i.e., Type A) Service

Referring again to FIG. 9 and FIG. 10, the pilots 14 of the first type (i.e., type A) service and the data 22 and the pilot 24 of the second type (i.e., type B) service may be allocated so that $\Gamma^A \cap \Lambda^B \neq 0$ and $\Gamma^A \cap \Gamma^B \neq 0$. Here, $\Gamma^A$ denotes the region to which the pilots 14 of the first type (i.e., type A) service are allocated, and $\Lambda^B$ denotes the region to which the data 22 of the second type (i.e., type B) service is allocated. Also, $\Gamma^B$ denotes the region to which the pilots 24 of the second type (i.e., type B) service are allocated. In this case, it may be difficult to demodulate the data or measure the channel state using the pilots 14 of the first type (i.e., type A) service at the receiving-end communication node.

Referring again to FIG. 11, the communication node 200 may allocate the pilots 14 of the first type (i.e., type A) service and the data 22 and the pilots 24 of the second type (i.e., type B) service, so that $\Gamma^A \cap \Lambda^B \approx 0$ and $\Gamma^A \cap \Gamma^B \approx 0$, and thus the data demodulation and the channel state measurement can be performed smoothly at the receiving-end communication node using the pilots 14 of the first type (i.e., type A) service. Here, $\Gamma^A$ denotes the region to which the pilots 14 of the first type (i.e., type A) service are allocated, and $A^B$ denotes the region to which the data 22 of the second type (i.e., type B) service is allocated. Also, $\Gamma^B$ denotes the region to which the pilots 24 of the second type (i.e., type B) service are allocated. That is, the communication node 200 may allocate the pilots 14 of the first type (i.e., type A) service so as not to overlap with the data 22 and the pilots 24 of the second type (i.e., type B) service.

A Third Scheme for Allocating Pilots of the First Type (i.e., Type A) Service

Referring again to FIG. 9, the communication node 200 may allocate the resources so that a portion in which the pilots 14 of the first type (i.e., type A) are overlapped with the data 22 or the pilots 24 of the second type (i.e., type B) service becomes small. For example, the $6^{th}$ symbol among the (n+k)-th symbol to the (n+k+Tb)-th symbol, to which the pilots 14 of the first type (i.e., type A) service are allocated, may be included in the transmission time of the second type (i.e., type B) service. On the other hand, the $7^{th}$, $13^{th}$, and $14^{th}$ symbols among the (n+k)-th symbol to the (n+k+Tb)-th symbol, to which the pilots 14 of the first type (i.e., type A) service are allocated, may not be included in the transmission time of the second type (i.e., type B) service.

A Fourth Scheme for Allocating Pilots of the First Type (i.e., Type A) Service

The communication node 200 may overlap a portion of the region $\Gamma^A$ to which the pilots 14 of the first type (i.e., type A) service are allocated in the block period Tb of the second type (i.e., type B) service. In this case, the communication node 200 may allocate the pilots 24 of the second type (i.e., type B) service for demodulation and channel estimation of the data 12 of the first type (i.e., type A) service. That is, the receiving-end communication node may perform demodulation and channel estimation of the data 12 of the first type (i.e., type A) service by using the pilots 24 of the second type (i.e., type B) service allocated to the received subframe.

For this, the pilots 24 of the second type (i.e., type B) service may be allocated to be shared with the receiving-end communication node (e.g., User Equipment: UE) that receives the data 12 of the first type (i.e., type A) service.

For example, a precoding applied to the data 22 of the second type (i.e., type B) service may be applied to a portion of the pilots 24 of the second type (i.e., type B) service, which are not overlapped with the pilots 14 of the first type (i.e., type A) service. On the other hand, as shown in FIG. 10, a precoding applied to the data 12 of the first type (i.e., type A) service may be applied to the pilots 24 of the second type (i.e., type B) service allocated to the portion (e.g., the $6^{th}$ symbol) overlapped with the pilots 14 of the first type (i.e., type A) service.

As another example, a precoding applied to the data 12 of the first type (i.e., type A) service and the data 22 of the second type (i.e., type B) service may be commonly applied to the pilots 24 of the second type (i.e., type B) service allocated to the portion (e.g., the $6^{th}$ symbol) overlapped with the pilots 14 of the first type (i.e., type A) service.

As yet another example, a precoding may not be applied to the pilots 14 of the second type (i.e., type B) service allocated to the portion (e.g., the $6^{th}$ symbol) overlapped with the pilots 14 of the first type (i.e., type A) service.

In this case, the transmitting-end communication node 200 may inform the receiving-end communication nodes (i.e., UE1 and UE2) about the applied precoding through control information. For example, the communication node 200 may inform whether a group-specific or common precoding that the communication node UE1 of the first type (i.e., type A) service and the communication node UE2 of the second type (i.e., type B) service share is applied or not to the pilots 24 of the second type (i.e., type B) service in the $6^{th}$ symbol of FIG. 10. Also, the communication node 200 may inform whether a UE-specific precoding of the communication node UE1 of the first type (i.e., type A) service or a UE-specific precoding of the communication node UE2 of the second type (i.e., type B) service is applied to the pilots 24 of the second type (i.e., type B) service in the $6^{th}$ symbol of FIG. 10.

A Fifth Scheme for Allocating Pilots of the First Type (i.e., Type A) Service

The communication node 200 may overlap the pilots 14 of the first type (i.e., type A) service with the data 22 and the pilots 24 of the second type (i.e., type B) service. That is, the communication node 200 may configure the locations of the pilots 14 of the first type (i.e., type A) service to be equal to the locations of the pilots 24 of the second type (i.e., type B) service.

Here, the communication node 200 may use constant amplitude zero auto correlation (CAZAC) sequences or Zadoff-Chu sequences so that sequences of the pilots of the first type (i.e., type A) service and the second type (i.e., type B) service are orthogonal to each other or a correlation between them is small. That is, the communication node 200 may configure frequency components of the subcarriers of the pilots 14 of the first type (i.e., type A) service to be orthogonal to the frequency components of the subcarriers of the pilots 24 of the second type (i.e., type B) service. In this case, the communication node 200 may include information indicating which pilot sequence is used for the first type (i.e., type A) service and the second type (i.e., type B) service in the control information.

As another example, when considering only the $6^{th}$ symbol of FIG. 11, the communication node 200 may configure the locations of the subcarriers of the pilots 14 of the first type (i.e., type A) service to be orthogonal to the locations of the subcarriers of the pilots 24 of the second type (i.e., type B) service.

The communication node 200 may allocate the data 12 and the pilots 14 of the first type (i.e., type A) service, and the data 22 and the pilots 24 of the second type (i.e., type B) service by using a combination of the first to fifth schemes for allocating the pilots 14 of the first type (i.e., type A) service described above.

Figure 13:
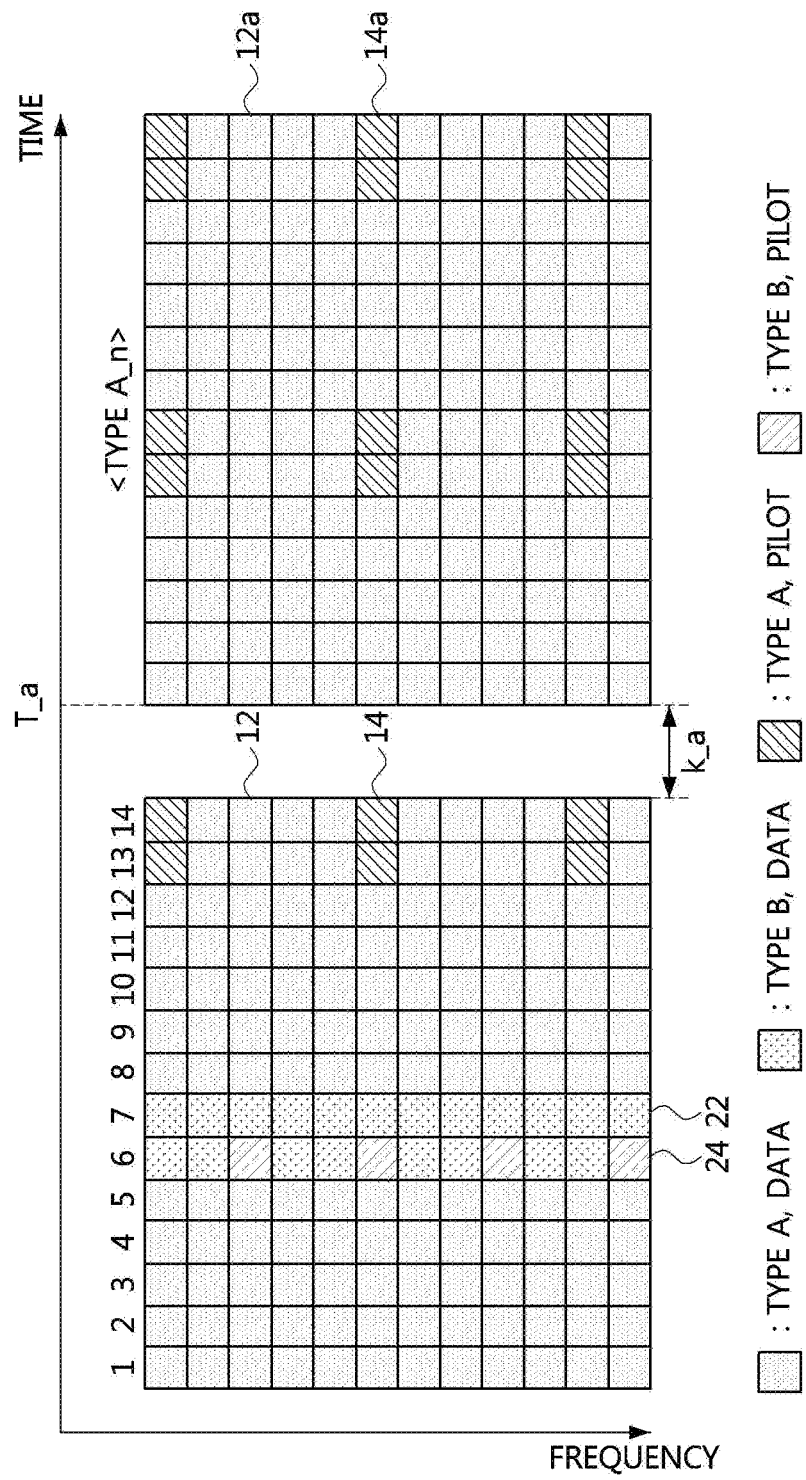
FIG. 13 is a diagram illustrating an example of a resource allocation method for a next transmission of a first service type.

FIG. 13 is a diagram illustrating an example of a resource allocation method for a next transmission of a first service type.

Referring to FIG. 13, the communication node 200 may transmit the data 12 of the first type (i.e., type A) service and the data 22 of the second type (i.e., type B) service by applying the overlapped resource allocation method. Thereafter, the communication node 200 may not apply the overlapped resource allocation method when retransmitting the data (referred to as 'data 12a') of the first type (i.e., type A) service.

As an example, when retransmitting the data 12a of the first type (i.e., type A) service, the communication node 200 may allocate the data 12a and pilots 14a in the subframe, and may not allocate the data and the pilots of the second type (i.e., type B) service.

As another example, when transmitting new data of the first type (i.e., type A) service, the new data and pilots may be allocated in the subframe, and the data and the pilots of the second type (i.e., type B) service may not be allocated in the subframe. Thereafter, when the retransmission is performed for the new data of the first type (i.e., type A) service, the overlapped resource allocation method described with reference to FIGS. 7 to 11 may be applied when the retransmission data is transmitted. When retransmitting the data of the first type (i.e., type A) service, the number of pilot subcarriers may be increased as compared with the case of the previous transmission. This makes it possible to increase recovery reliability of the data received at the receiving-end communication node (e.g., UE).

Figure 14:
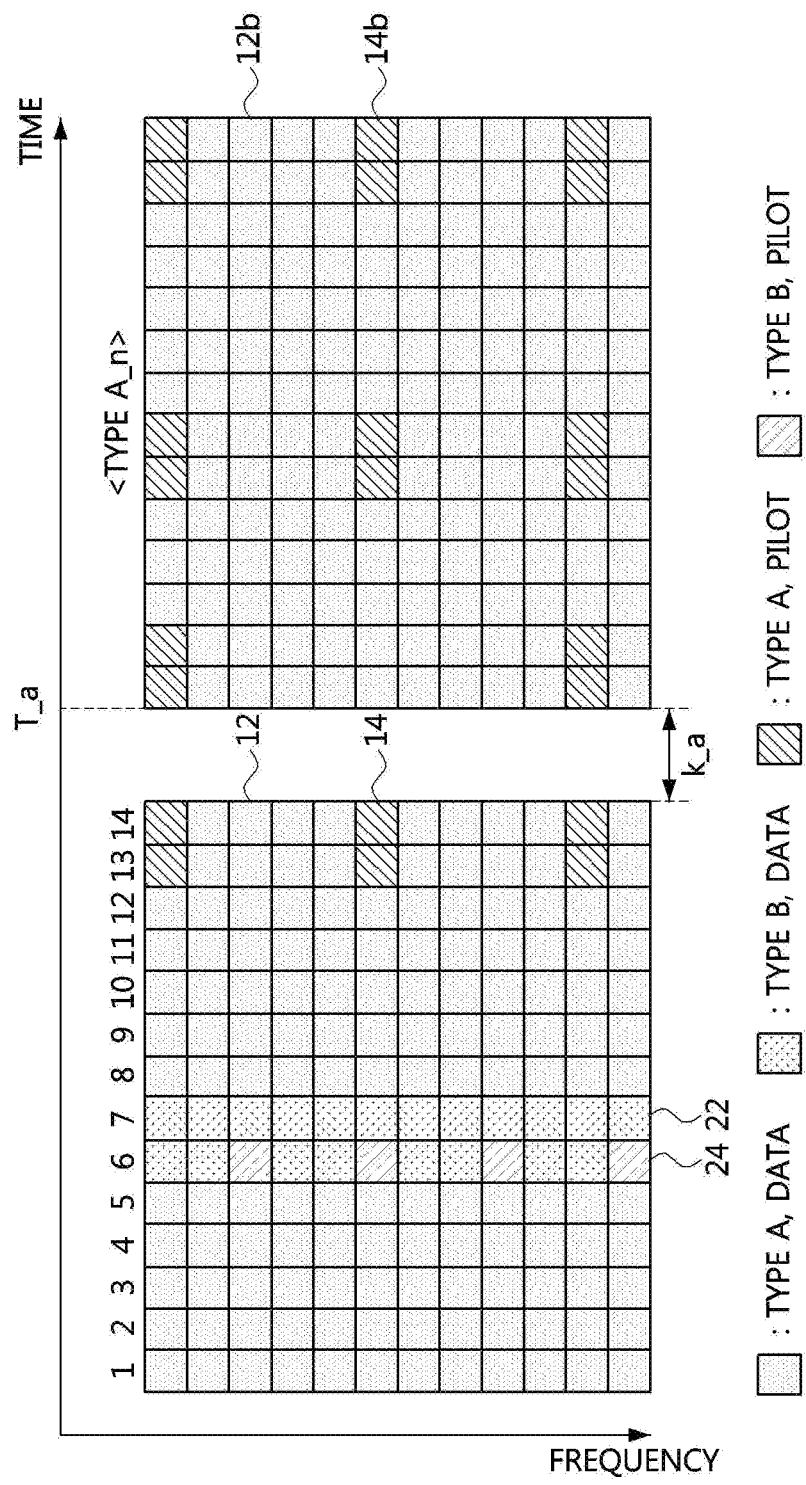
FIG. 14 is a diagram illustrating another example of a resource allocation method for a next transmission of a first service type.

FIG. 14 is a diagram illustrating another example of a resource allocation method for a next transmission of a first service type.

Referring to FIG. 14, the communication node 200 may allocate the next data 12b and the next pilots 14b in the same frequency band as that of the previous transmission at the next transmission for the data 12 of the first type (i.e., type A) service. In this case, the next data 12b and the next pilots 14b may be transmitted after a predetermined time (k_a). Here, k_a may be a positive integer equal to or greater than 0.

Also, when the pilots 14 of the first type (i.e., type A) are overlapped with the data 22 or the pilots 24 of the second type (i.e., type B) in the previous transmission, the number of subcarriers of the pilots 14b may be increased at the retransmission of the data 14b of the first type (i.e., type A) service. In this case, the retransmitted pilots 14b may be allocated to the region to which the data 22 and the pilots 24 of the second type (i.e., type B) service are allocated at the previous transmission. Through this, the recovery reliability of the data received at the receiving-end communication node (e.g., UE) may be improved.

Figure 15:
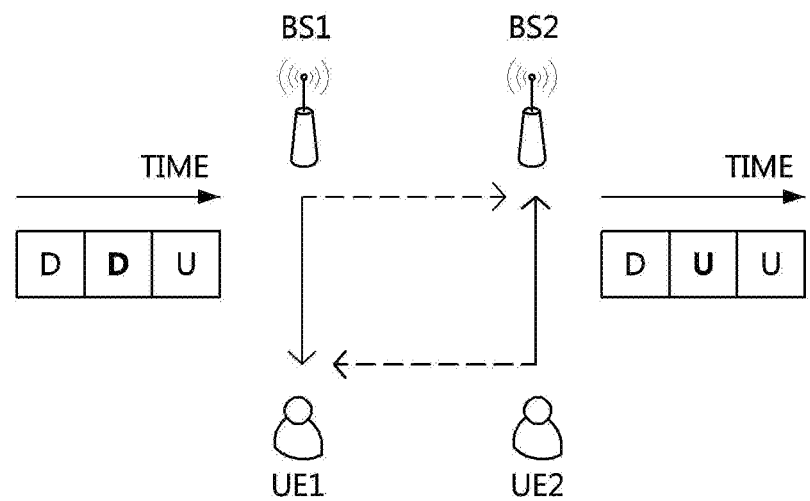
FIG. 15 is diagram describing cross-link interferences.

FIG. 15 is a diagram describing cross-link interferences.

Referring to FIG. 15, cross-link interference may occur between downlink (DL) and uplink (UL) because downlink and uplink durations are different between adjacent transmission reception points (TRPs) or cells. Such the cross-link interference may occur between a first base station BS1 and a second base station BS2 and may occur between the first terminal UE1 and the second terminal UE2.

For example, when the second terminal UE2 performs uplink (UL) transmission to the second base station BS2, the uplink signal of the second terminal UE2 may affect the downlink signal of the first terminal UE1. In particular, the closer the distance between the first terminal UE1 and the second terminal UE2 is, the greater the cross-link interference may be. When the flexible TDD scheme is applied, since downlink and uplink are switched from time to time, the conventional eIMTA scheme may not effectively reduce the cross-link interference. In the present invention, even when downlink and uplink are switched from time to time, the cross-link interference may be reduced by using elements that do not change for a predetermined period. Here, the first base station BS1 and the second base station BS2 may be TRPs.

Figure 16:
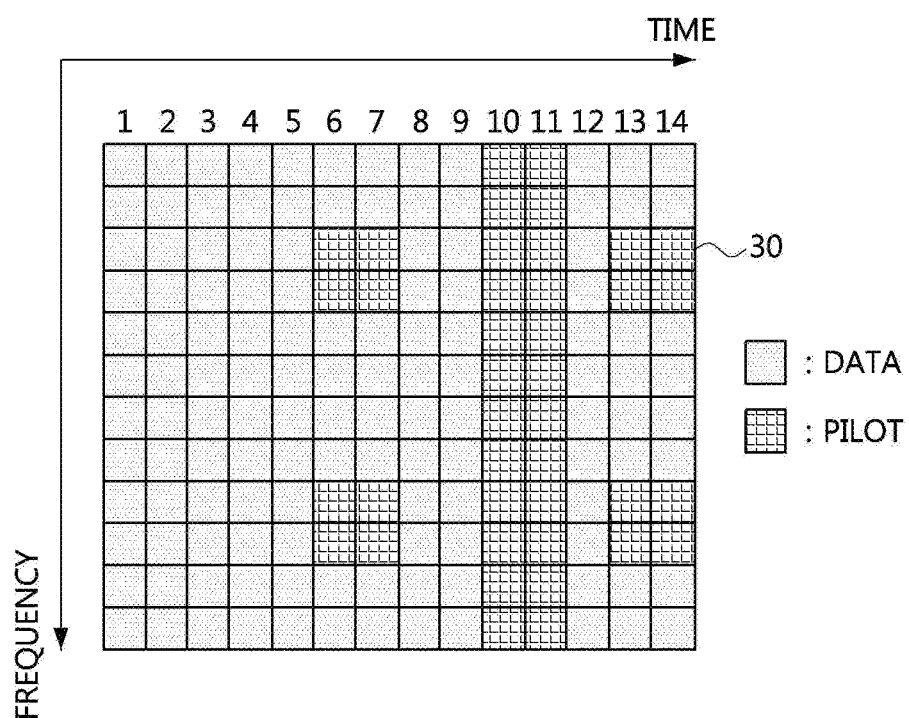
FIG. 16 is a diagram illustrating an example of a pilot arrangement scheme to which a beamforming (precoding) is applied.
Figure 17:
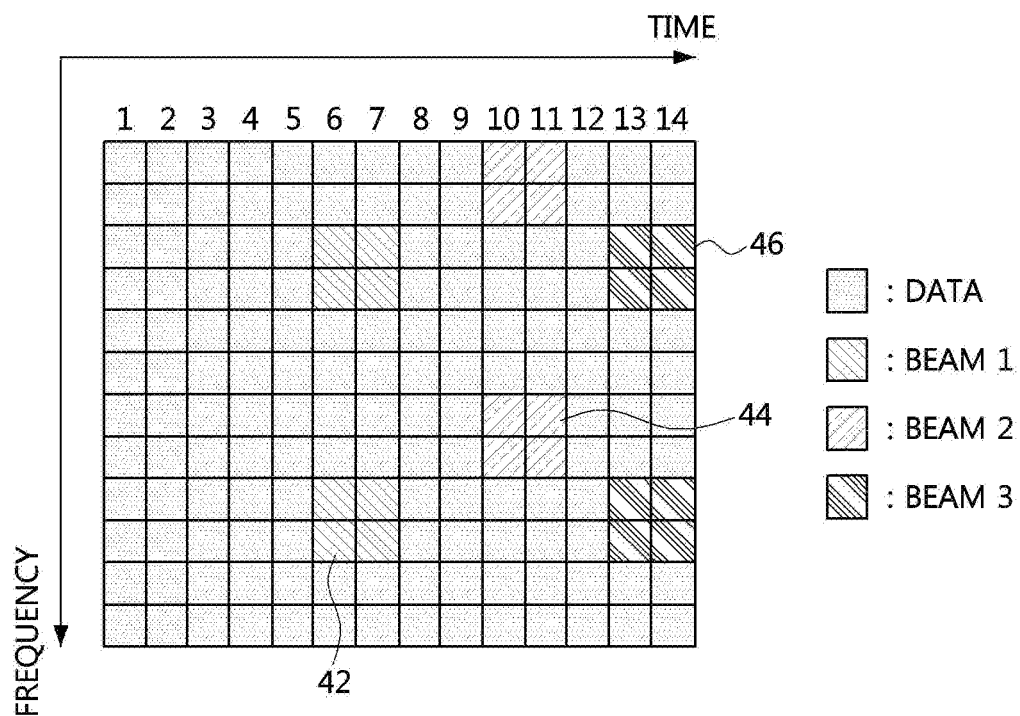
FIG. 17 is a diagram illustrating another example of a pilot arrangement scheme to which a beamforming (precoding) is applied.

FIG. 16 is a diagram illustrating an example of a pilot arrangement scheme to which a beamforming (precoding) is applied, and FIG. 17 is a diagram illustrating another example of a pilot arrangement scheme to which a beamforming (precoding) is applied.

Referring to FIGS. 16 and 17, a method and an apparatus for signal transmission according to the present invention may apply a beam selection scheme to mitigate the cross-link interference between adjacent TRPs or cells, and a beam measurement method for the beam selection may be proposed.

As shown in FIG. 16, the communication node 200 may allocate pilots 30 in a subframe as channel state information-reference signal (CSI-RS). In this case, the pilots 30 may be arranged at subcarrier locations according to a port.

As shown in FIG. 17, the communication node 200 may utilize the pilots 30 as beamformed CSI-RS. The communication node 200 may arrange CSI-RS 42 for a first beam in the $6^{th}$ and $7^{th}$ symbols. Also, the communication node 200 may arrange CSI-RS 44 for a second beam in the $9^{th}$ and $10^{th}$ symbols. Also, the communication node 200 may arrange CSI-RS 46 for a third beam in the $13^{th}$ and $14^{th}$ symbols. As shown in FIG. 17, by respectively arranging the CSI-RSs 42, 44, and 46 for the first to third beams, the terminal receiving the CSI-RSs may estimate the CSI for each of the first to third beams.

Here, the communication node 200 may configure the locations of the pilot subcarriers for beam measurement as Equation 5 below.

$$\Theta^{DL} = \{\omega_i^{DL} | i=1, \ldots, N_\omega^{DL}\} \quad \text{[Equation 5]}$$

In Equation 5, $\omega_i^{DL}$ denotes the location of the pilot subcarrier corresponding to the i-th beam, and $N_\omega^{DL}$ denotes the number of beams supported in the downlink (DL).

The beam measurement method described with reference to FIGS. 16 and 17 may be applied to a flexible duplexing scheme, and the beam measurement method may be applied to not only downlink (DL) but also uplink (UL).

Beam Measurement Method According to a First Embodiment

The communication node 200 may configure the locations of the pilot subcarriers commonly used in downlink (DL) and uplink (UL) as shown in Equation 6 below.

$$\Theta = \{\omega_i | i=1, \ldots, N_\omega\} \quad \text{[Equation 6]}$$

In Equation 6, $N_\omega$ denotes the sum of the number $N_\omega^{DL}$ of beams supported in the downlink (DL) and the number $N_\omega^{UL}$ of beams supported in the uplink (UL). $\Theta$ of Equation 6 denotes an example of the CSI-RS. As another example, the communication node 200 may use pilots at other locations, such as demodulation reference signal (DMRS), rather than the CSI-RS.

As shown in FIG. 10, when the pilots 14 of the first type (i.e., type A) service and the pilots 24 of the second type (i.e., type B) service overlap, the communication node 200 may allocate sequences or resources so that the pilots are orthogonal by using the DMRS.

Through this, even when the transmission signal for uplink (UL) of the second terminal UE2 is received as being confused at the reception resource locations for downlink (DL) of the first terminal UE1, the intensity of the cross-link interference and the interfering beam for the second terminal UE2 may be estimated by distinguishing between the beams for the pilots.

Here, when the intensity of the cross-link interference is equal to or greater than a specific level, the terminal may report to the first base station BS1 and may prohibit use of a specific beam through inter-base station communication (e.g., BS1-to-BS2). Also, the second terminal UE2 may use a sub-optimal beam because the prohibited beam is basically an optimal beam needed for communication with the second base station BS2. In this case, channel information (e.g., a quantized channel, beam index, CQI, PMI, RI, CSI, etc.) due to the use of the sub-optimal beam may be reported to the second base station BS2. The beam measurement method described above may be equally applied to interference between terminals (i.e., UE-to-UE interference) and interference between base stations (i.e., BS-to-BS interference).

Meanwhile, when the adjacent TRPs or cells are not synchronized, time synchronization may not be acquired. Also, when synchronized with the base station in the uplink, synchronization with the adjacent UE may not be acquired due to application of a timing advance (TA). In the present invention, interference between subcarriers may be reduced by arranging a cyclic prefix (CP). The beam measurement method may be applied when an adjacent signal falls within the CP at the receiving end.

Figure 18:
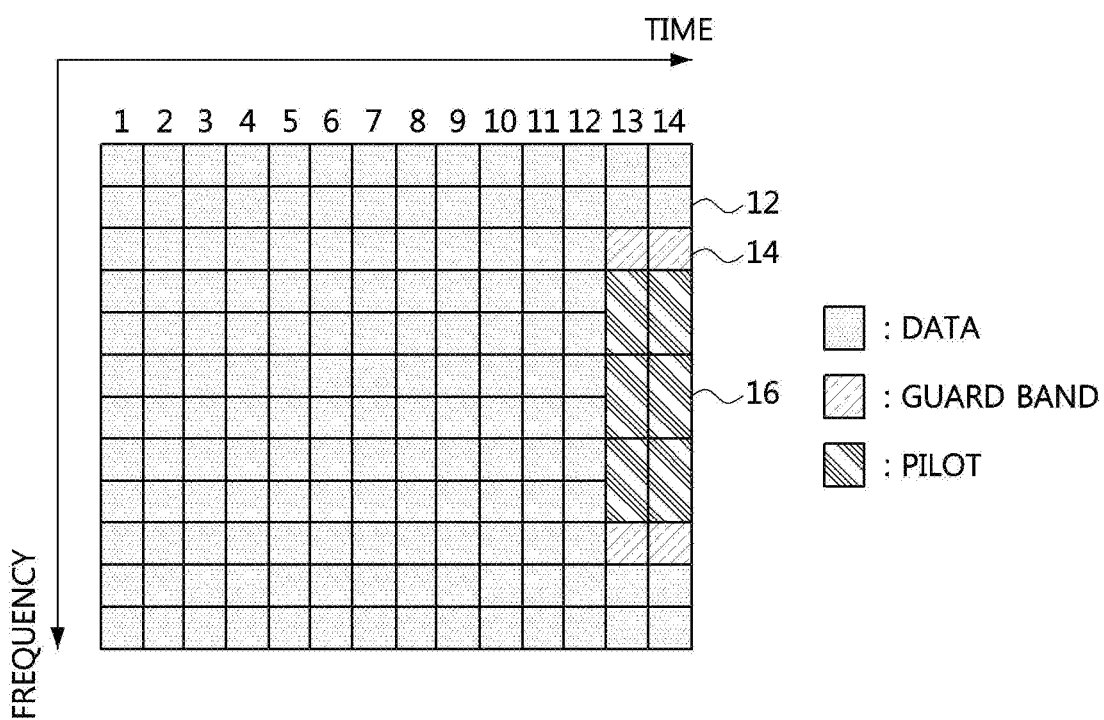
FIG. 18 is a diagram illustrating a pilot arrangement scheme to which multiple numerologies are applied.

FIG. 18 is a diagram illustrating a pilot arrangement scheme to which multiple numerologies are applied.

Referring to FIG. 18, when the communication node 200 allocates a pilot signal to a subframe in the downlink (DL) or the uplink (UL), multiple numerologies may be applied.

Assuming that the data 12 has a subcarrier spacing of f1, the pilots 14 may have a subcarrier spacing of f2 (f2=m*f1, where m is a positive integer greater than or equal to 2, and m=2 in FIG. 17). The communication node 200 may arrange a guard band 16 to mitigate interference between subcarriers caused by the different subcarrier spacings. The guard band 16 may be arranged above and below the pilots 14 on the frequency axis.

Figure 19:
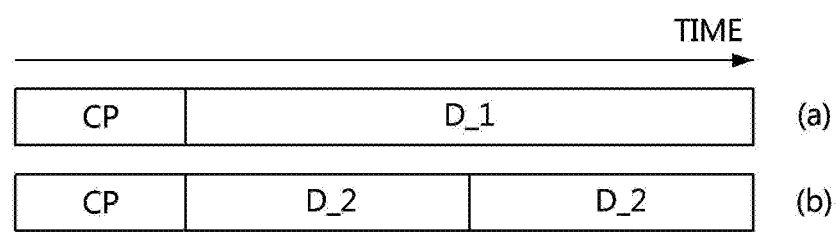
FIG. 19 is a diagram illustrating a method for configuring symbols in the pilots illustrated in FIG. 18.

FIG. 19 is a diagram illustrating a method for configuring symbols in the pilots illustrated in FIG. 18.

Referring to FIG. 19, the communication node 200 may configure symbols on the time axis of a subframe. The communication node 200 may configure time-axis symbols of a data part to which the subcarrier spacing of f1 is applied, as shown in (a) of FIG. 19. Also, the communication node 200 may configure time-axis symbols of a pilot part to which the subcarrier spacing of f2 is applied, as shown in (b) of FIG. 19.

Configuring the time-axis symbols of the data part and the time-axis symbols of the pilot part as shown in FIG. 19, when the difference between the transmission and reception time points between the first and second terminals UE1 and UE2 is equal to or less than D_½, the effect of the time synchronization error may be mitigated.

In order to configure the symbols in (b) of FIG. 19, multiple numerologies may be applied to the pilot subcarrier Θ, and the pilots may be configured in a comb-like pattern similar to the sounding reference signal (SRS) of the LTE system. By applying the above-described method in the same way, each of the beams for the pilot may be distinguished from each other, so that the intensity of the cross-link interference and the interfering beam to the second terminal UE2 may be estimated.

Figure 20:
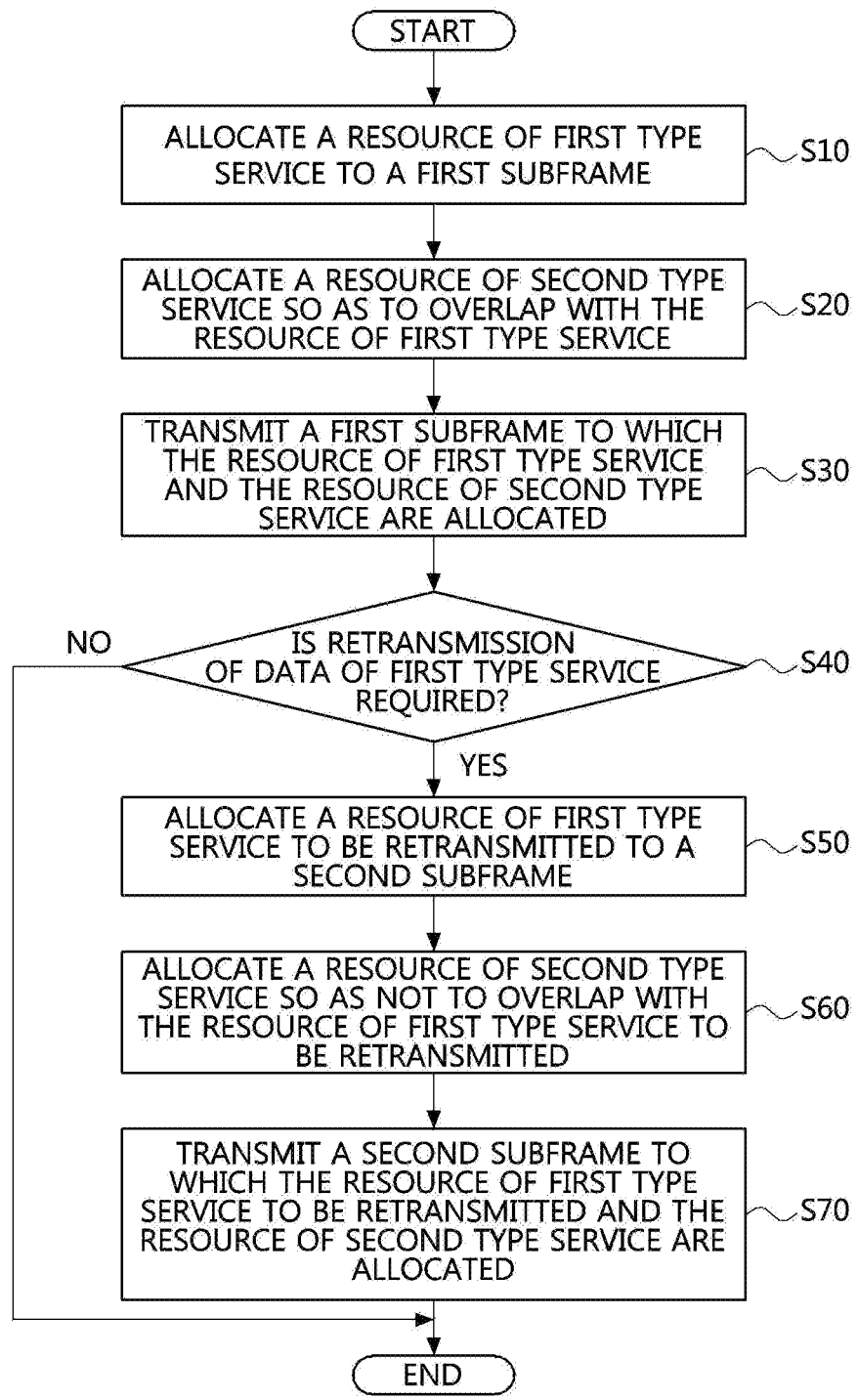
FIG. 20 is a diagram illustrating a signal transmission method according to an embodiment of the present disclosure.

FIG. 20 is a diagram illustrating a signal transmission method according to an embodiment of the present disclosure.

Hereinafter, a signal transmission method according to an embodiment of the present invention will be described with reference to FIGS. 6 to 11 together with FIG. 20.

The communication node 200 may allocate the resources for the first type (i.e., type A) service to the first block period Ta consecutively allocated on the time axis in the subframe (S10). Here, the resources for the first type (i.e., type A) service may be composed of the first data 12 and the first pilots 14 (e.g., reference signal).

Then, the communication node 200 may allocate the resources for the second type (i.e., type B) service to the second block period Tb consecutively allocated on the time axis in the subframe (S10). In this case, the resources for the second type (i.e., type B) service may be allocated to overlap with the resources for the first type (i.e., type A) service (S20). Here, the resources for the second type (i.e., type B) service may be composed of the second data 22 and the second pilots 24 (e.g., reference signal).

As an example shown in FIG. 7, the communication node 200 may allocate the second data 22 and the second pilots 24 to a part of a region ($1^{st}$ to $5^{th}$ symbols, $8^{th}$ to $12^{th}$ symbols) to which the first data 12 is allocated. In FIG. 7, an example where the second data 22 and the second pilots 24 are allocated to the $3^{rd}$ to $4^{th}$ symbols among the $1^{st}$ to $5^{th}$ symbols and the $8^{th}$ to $12^{th}$ symbols to which the first data 12 is allocated is illustrated. That is, the communication node 200 may allocate the second data 22 and the second pilots 24 to the $3^{rd}$ to $4^{th}$ symbols so as to overlap with the first data 12. In this case, the first pilots 14 may be allocated to the $6^{th}$ to $7^{th}$ symbols and the $13^{th}$ to $14^{th}$ symbols, and the first pilots 14 may be allocated so as not to overlap with the second data 22 and the second pilots 24. In this manner, since the first pilots 14 do not overlap with the second data 22 and the second pilots 24, degradation of channel estimation performance and decoding performance for the first data using the first pilots 14 at the receiving end requesting the first type (i.e., type A) service may be prevented.

As another example shown in FIG. 8, the communication node 200 may allocate the second pilots 24 to a part of the region ($1^{st}$ to $5^{th}$ symbols, $8^{th}$ to $12^{th}$ symbols) to which the first data 12 is allocated. Also, the communication node 200 may allocate the second data 22 to a part of the region ($1^{st}$ to $5^{th}$ symbols, $8^{th}$ to $12^{th}$ symbols) to which the first pilots 14 are allocated. In FIG. 8, an example where the second pilots 24 are allocated to the $5^{th}$ symbol among the $1^{st}$ to $5^{th}$ symbols and the $8^{th}$ to $12^{th}$ symbols to which the first data 12 is allocated is illustrated. Also, it is illustrated that the second data 22 is allocated in the $6^{th}$ symbol among the $6^{th}$ to $7^{th}$ symbols and the $13^{th}$ to $14^{th}$ symbols to which the first pilots 14 are allocated. That is, the communication node 200 may allocate the second pilots 24 in the $5^{th}$ symbol so as to overlap with the first data 12. Also, the communication node 200 may allocate the second data 22 in the $5^{th}$ to $6^{th}$ symbols so as to overlap with the first data 12 and the first pilots 14.

As yet another example shown in FIG. 9, the communication node 200 may allocate the second data 22 and the second pilots 24 to a part of a region ($6^{th}$ to $7^{th}$ symbols, $13^{th}$ to $14^{th}$ symbols) to which the first pilots 14 are allocated. In FIG. 9, an example where the second data 22 is allocated to the $6^{th}$ to $7^{th}$ symbols among the $6^{th}$ to $7^{th}$ symbols and the $13^{th}$ to $14^{th}$ symbols to which the first pilots 14 are allocated is illustrated. That is, the communication node 200 may allocate the second pilots 24 to the $6^{th}$ symbol, and allocate the second data 22 to the $6^{th}$ and $7^{th}$ symbols so as to overlap with the first pilots 14. In this case, the second data 22 and the second pilot 24 may not be allocated to the $1^{st}$ to $5^{th}$ symbols and the $8^{th}$ to $12^{th}$ symbols to which the first data 12 is allocated.

As yet another example shown in FIG. 10, the communication node 200 may allocate the second data 22 and the second pilots 24 to a part of a region ($6^{th}$ to $7^{th}$ symbols and $13^{th}$ to $14^{th}$ symbols) to which the first pilots 14 are allocated. In FIG. 10, an example where the second data 22 and the second pilots 24 are allocated to the $6^{th}$ to $7^{th}$ symbols among the $6^{th}$ to $7^{th}$ symbols and the $13^{th}$ to $14^{th}$ symbols to which the first pilots 14 are allocated is illustrated. Here, the second data 22 and the second pilots 24 may be allocated in the $6^{th}$ to $7^{th}$ symbols so as not to overlap with the first pilots 14. Also, the second data 22 and the second pilots 24 may be allocated in the $6^{th}$ to $7^{th}$ symbols so as to overlap with the first data 12. That is, the communication node 200 may allocate the second data 22 and the second pilots 24 to the same locations as the first pilots 14 on the time axis, but allocate the second data 22 and the second pilots 24 to different locations from those of the first pilots 14 on the frequency axis. Through this, the first pilots 14 may be allocated so as not to overlap with the second data 22 and the second pilots 24. In this manner, since the first pilots 14 do not overlap with the second data 22 and the second pilots 24, degradation of channel estimation performance and decoding performance for the first data using the first pilots 14 at the receiving end requesting the first type (i.e., type A) service may be prevented.

Then, the first subframe to which the resources for the first type (i.e., type A) service and the resources for the second type (i.e., type B) service are allocated may be transmitted (S30).

The communication node 200 may transmit the first subframe to which the resources for the first type (i.e., type A) service and the resources for the second type (i.e., type B) service are allocated to the first receiving-end communication node requesting the first type service (i.e., type A) service and the second receiving-end communication node requesting the second type service (i.e., type B). The first receiving-end communication node receiving the first subframe may estimate a channel by using the first pilot allocated to the first subframe and decode first data. Also, the second receiving-end communication node receiving the first subframe may estimate a channel by using the second pilot allocated to the first subframe and decode second data.

Then, after transmitting the first subframe, the communication node 200 may determine whether to retransmit the data 12 of the first type (i.e., type A) service according to whether an ACK or NACK is received from the first receiving-end communication node receiving the resources for the first type (i.e., type A) service (S40). Similarly, after transmitting the first subframe, the communication node 200 may determine whether to retransmit the data 22 of the second type (i.e., type B) service according to whether an ACK or NACK is received from the second receiving-end communication node receiving the resources for the second type (i.e., type B) service. Hereinafter, a case in which retransmission of the data 12 of the first type (i.e., type A) service is required will be described as an example.

As a result of the determination in the S40, when retransmission of the data 12 of the first type (i.e., type A) service is required, the communication node 200 may allocate the data 12 of the first type (i.e., type A) service required to be retransmitted and the pilots 14 to a second subframe (S50).

Then, the communication node 200 may allocate the resources for the second type (i.e., type B) service to the second subframe. In this case, the communication node 200 may allocate the resources for the second type (i.e., type B) service so as not to overlap with the resources for the first type (i.e., type A) service to be retransmitted in the second subframe (S60). Since the data to be retransmitted has a transmission priority, the resources for the second type (i.e., type B) service may be allocated to a space remaining after allocating the resources for the first type (i.e., type A) service.

Then, the communication node 200 may transmit the second subframe to which the resources for the first type (i.e., type A) service to be retransmitted and the resources for the second type (i.e., type B) service are allocated (S70).

The present invention may provide a method and an apparatus for resource allocation which are applicable to various technical scenarios of 5G new radio (NR), and a method for signal transmission. Also, the present invention may provide a method and an apparatus for resource allocation which are applicable to 5G new radio (NR). Also, the resource allocation method and apparatus and the signal transmission method according to the embodiment of the present invention can reduce cross-link interference between downlink (DL) and uplink (UL).

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. An operation method of a communication node for allocating resources in a communication node, the operation method comprising:
    allocating first data and first pilots for a first type service to a first block period of a first subframe;
    allocating second data and second pilots for a second type service to a second block period overlapping with the first block period; and
    transmitting the first subframe to another communication node,
    wherein at least one of the second data and the second pilots are allocated to a region to which the first data is allocated.

2. The operation method according to claim 1, wherein the first pilots and the second pilots are allocated to different locations on a time axis.

3. The operation method according to claim 2, wherein the first pilots and the second pilots are allocated to same locations on a frequency axis.

4. The operation method according to claim 1, further comprising:
    receiving a retransmission request of the first data transmitted through the first subframe;
    reallocating the first data retransmission of which is requested and the first pilots to a second subframe; and
    transmitting the second subframe.

5. The operation method according to claim 4, wherein, in the reallocating to the second subframe, the first data retransmission of which is requested and the first pilots are allocated to locations different from locations of third data for the second type service.

6. The operation method according to claim 4, wherein, in the reallocating to the second subframe, the first data retransmission of which is requested and the first pilots are allocated to locations different from locations of third pilots for the second type service.

7. The operation method according to claim 4, wherein the first data retransmitted through the second subframe is allocated to a same frequency band as a frequency band allocated to the first subframe.

8. The operation method according to claim 1, wherein each of the first type service and the second type service is one of an enhanced mobile broadband (eMBB) service, an ultra-reliability low-latency communication (URLLC) service, and a massive machine-type communication (mMTC) service, and the first type service is different from the second type service.

9. An operation method of a communication node for allocating resources in a communication node, the operation method comprising:
   allocating first data and first pilots for a first type service to a first block period of a first subframe;
   allocating second data and second pilots for a second type service to a second block period overlapping with the first block period; and
   transmitting the first subframe to another communication node,
   wherein at least one of the second data and the second pilots are allocated to a region to which the first pilots are allocated.

10. The operation method according to claim 9, wherein the first pilots and the second pilots are allocated to same locations on a time axis.

11. The operation method according to claim 10, wherein the first pilots and the second pilots are allocated to different locations on a frequency axis.

12. The operation method according to claim 9, further comprising:
    receiving a retransmission request of the first data transmitted through the first subframe;
    reallocating the first data retransmission of which is requested and the first pilots to a second subframe; and
    transmitting the second subframe.

13. The operation method according to claim 12, wherein, in the reallocating to the second subframe, the first data retransmission of which is requested and the first pilots are allocated to locations different from locations of third data for the second type service.

14. The operation method according to claim 12, wherein, in the reallocating to the second subframe, the first data retransmission of which is requested and the first pilots are allocated to locations different from locations of third pilots for the second type service.

15. The operation method according to claim 12, wherein the first data retransmitted through the second subframe is allocated to a same frequency band as a frequency band allocated to the first subframe.

16. The operation method according to claim 9, wherein each of the first type service and the second type service is one of an enhanced mobile broadband (eMBB) service, an ultra-reliability low-latency communication (URLLC) service, and a massive machine-type communication (mMTC) service, and the first type service is different from the second type service.

17. An operation method of a communication node requesting a first type service in a communication network, the operation method comprising:
    receiving from a transmitting-end communication node a first subframe to which first data and first pilots of a first type service and second data and second pilots for a second type service different from the first type service; and
    decoding the first data using the first pilots,
    wherein the first data is allocated to the first subframe so as to overlap with at least one of the second data and the second pilots.

18. The operation method according to claim 17, wherein the first pilots are allocated to locations different from locations of the second data and the second pilots on a frequency axis and a time axis.

19. The operation method according to claim 17, further comprising:
    requesting the transmitting-end communication node to retransmit the first data; and
    receiving a second subframe to which the first data retransmission of which is requested and the first pilots, and third data and third pilots for the second type service are allocated,
    wherein the first data retransmission of which is requested and the first pilots are allocated to locations different from locations of the third data and the third pilots.

20. The operation method according to claim 19, wherein the first data retransmitted through the second subframe is allocated to a same frequency band as a frequency band allocated to the first subframe.

* * * * *